United States Patent
Abay et al.

(10) Patent No.: US 12,079,816 B2
(45) Date of Patent: Sep. 3, 2024

(54) SYSTEM, METHOD, AND COMPUTER PROGRAM PRODUCT FOR DETECTING MERCHANT DATA SHIFTS

(71) Applicant: Visa International Service Association, San Francisco, CA (US)

(72) Inventors: Nazmiye Ceren Abay, Kirkland, WA (US); Girish Ramachandran, Milpitas, CA (US); Dustin White, Lone Tree, CO (US); Rajan Gangadharan, Campbell, CA (US); Pratishtha Deep, Austin, TX (US); Arshad Thekkthody Pilakoth, Fremont, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 18/015,190

(22) PCT Filed: Aug. 26, 2022

(86) PCT No.: PCT/US2022/041619
§ 371 (c)(1),
(2) Date: Jan. 9, 2023

(87) PCT Pub. No.: WO2023/048893
PCT Pub. Date: Mar. 30, 2023

(65) Prior Publication Data
US 2023/0214843 A1  Jul. 6, 2023

Related U.S. Application Data

(60) Provisional application No. 63/247,961, filed on Sep. 24, 2021.

(51) Int. Cl.
*G06Q 20/40* (2012.01)
*H04L 9/40* (2022.01)

(52) U.S. Cl.
CPC .............................. *G06Q 20/4016* (2013.01)

(58) Field of Classification Search
None
See application file for complete search history.

(56) References Cited

U.S. PATENT DOCUMENTS

| | | | |
|---|---|---|---|
| 2005/0097464 A1* | 5/2005 | Graeber | G06Q 10/06315 715/700 |
| 2014/0143135 A1 | 5/2014 | Murphy et al. | |
| 2018/0350006 A1* | 12/2018 | Agrawal | G06F 7/026 |
| 2019/0295383 A1 | 9/2019 | Chen et al. | |
| 2019/0362351 A1* | 11/2019 | Reinhardt | G06Q 20/42 |

(Continued)

FOREIGN PATENT DOCUMENTS

WO    2021086365 A1    5/2021

OTHER PUBLICATIONS

Liu et al., "Isolation Forest", Proc. 8th IEEE Int. Conf. Data Mining, Dec. 2008, pp. 413-422.

*Primary Examiner* — Bennett M Sigmond
*Assistant Examiner* — Bhavin D Shah
(74) *Attorney, Agent, or Firm* — The Webb Law Firm

(57) ABSTRACT

Systems, methods, and computer program products for detecting merchant data shifts may identify a shift in transaction volume of a merchant system across Merchant Category Codes (MCCs) using a combination of time series analysis and machine learning.

3 Claims, 6 Drawing Sheets

(56) References Cited

U.S. PATENT DOCUMENTS

| | | |
|---|---|---|
| 2019/0392450 A1* | 12/2019 | Gosset .................. H04L 63/101 |
| 2020/0118136 A1 | 4/2020 | Zhang et al. |
| 2020/0380531 A1 | 12/2020 | Vaidya et al. |
| 2021/0209601 A1* | 7/2021 | Dutta ..................... G06Q 20/12 |
| 2022/0005041 A1* | 1/2022 | Chang ..................... G06F 18/24 |
| 2022/0239733 A1* | 7/2022 | Maheshwari ......... H04L 67/142 |

* cited by examiner

SYSTEM, METHOD, AND COMPUTER PROGRAM PRODUCT FOR DETECTING MERCHANT DATA SHIFTS

CROSS REFERENCE TO RELATED APPLICATIONS

This application is the U.S. national phase of International Application No. PCT/US2022/041619 filed Aug. 26, 2022, and claims the benefit of U.S. Provisional Patent Application No. 63/247,961, filed on Sep. 24, 2021, the disclosures of which are hereby incorporated by reference in their entirety.

BACKGROUND

1. Field

This disclosure relates to anomaly detection and, in some non-limiting embodiments or aspects, to detecting merchant data shifts using anomaly detection.

2. Technical Considerations

Electronic payment transactions are subject to risk evaluation with authorization rules and risk models by transaction service provider systems and issuer systems as part of an authorization approval process for the transactions. One of the features used in these authorization approval processes is Merchant Category Code (MCC), which is a four-digit number used to classify businesses into market segments, and that is associated with a transaction by the merchant that initiates the transaction. A change in the MCC may significantly affect an authorization rate and/or impact a risk profile for an issuer associated with the transaction. For example, transactions associated with a first MCC may be more likely to be approved and/or may be associated with lower risk by the authorization approval process than transactions associated with a second MCC different than the first MCC.

A merchant may purposely misclassify or miscode authorization requests for some transactions with incorrect MCCs to improve authorization rates for the transactions. For example, merchants may shift transaction volumes across MCCs to render authorization benefits and attempt to game the authorization approval process by coding authorization requests with varying MCCs, thereby evading reaching thresholds for compliance monitoring programs.

SUMMARY

Accordingly, provided are improved systems, devices, products, apparatus, and/or methods for detecting merchant data shifts. For example, non-limiting embodiments or aspects of the present disclosure may identify the shifting payment volumes across Merchant Category Codes (MCCs) using a combination of time series analysis and machine learning for each MCC and merchant system combination across each region or country over an extended period of time.

According to some non-limiting embodiments or aspects, provided is a computer-implemented method including: obtaining, with at least one processor, historical transaction data associated with a time series of a plurality of historical transactions at a merchant system over a historical period of time, the historical transaction data including a plurality of merchant category codes (MCCs) associated with the plurality of historical transactions; applying, with the at least one processor, a difference transform to the historical transaction data to generate transformed data; training, with the at least one processor, a machine learning model by applying a machine learning algorithm to the transformed data, the machine learning model generating an anomaly score associated with the merchant system; obtaining, with the at least one processor, previous transaction data associated with one or more previous transactions at the merchant system over a previous period of time after the historical period of time, the previous transaction data including one or more MCCs of the plurality of MCCs associated with the one or more previous transactions; processing, with the at least one processor, using the machine learning model, the previous transaction data to generate the anomaly score associated with the merchant system; and identifying, with the at least one processor, based on the anomaly score and at least one threshold anomaly score, a shift in transaction volume of the merchant system across MCCs for the previous period of time.

In some non-limiting embodiments or aspects, the method further includes: receiving, with the at least one processor, during processing of a current transaction at the merchant system in a transaction processing network, current transaction data associated with the current transaction, the current transaction data including an MCC of the plurality of MCCs associated with the current transaction; and determining, with the at least one processor, based on current transaction data and the anomaly score associated with the merchant system, a risk score associated with the current transaction.

In some non-limiting embodiments or aspects, the method further includes: comparing, with the at least one processor, the risk score to at least one threshold risk score; and in response to determining that the risk score satisfies the at least one threshold risk score, denying, with the at least one processor, authorization of the current transaction.

In some non-limiting embodiments or aspects, the historical transaction data includes a percentage distribution of a transaction amount for each MCC of the plurality of MCCs of a subset of transactions of the plurality of transactions for a plurality of historical sub-periods of time within the historical period of time, and a duration of a historical sub-period of time is a same duration as the previous period of time.

In some non-limiting embodiments or aspects, obtaining the historical transaction data includes generating a zero value for the percentage distribution of the transaction amount for each MCC for a historical sub-period of time that does not include a transaction of the plurality of transactions.

In some non-limiting embodiments or aspects, the previous transaction data includes a percentage distribution of a transaction amount for each MCC of the one or more MCCs of the one or more transactions for the previous period of time.

In some non-limiting embodiments or aspects, the machine learning algorithm includes an isolation forest algorithm, and wherein the machine learning model includes an isolation forest.

According to some non-limiting embodiments or aspects, provided is a system including: at least one processor programmed and/or configured to: obtain historical transaction data associated with a time series of a plurality of historical transactions at a merchant system over a historical period of time, the historical transaction data including a plurality of merchant category codes (MCCs) associated with the plurality of historical transactions; apply a difference transform to the historical transaction data to generate transformed data; train a machine learning model by applying a machine learning algorithm to the transformed data, the machine learning model generating an anomaly score associated with the merchant system; obtain previous transaction data associated with one or more previous transactions at the merchant system over a previous period of time after the historical period of time, wherein the previous transaction data includes one or more MCCs of the plurality of MCCs associated with the one or more previous transactions; process, using the machine learning model, the previous transaction data to generate the anomaly score associated with the merchant system; and identify, based on the anomaly score and at least one threshold anomaly score, a shift in transaction volume of the merchant system across MCCs for the previous period of time.

In some non-limiting embodiments or aspects, the at least one processor is further programmed and/or configured to: receive, during processing of a current transaction at the merchant system in a transaction processing network, current transaction data associated with the current transaction, the current transaction data including an MCC of the plurality of MCCs associated with the current transaction; and determine, based on current transaction data and the anomaly score associated with the merchant system, a risk score associated with the current transaction.

In some non-limiting embodiments or aspects, the at least one processor is further programmed and/or configured to: compare the risk score to at least one threshold risk score; and in response to determining that the risk score satisfies the at least one threshold risk score, deny authorization of the current transaction.

In some non-limiting embodiments or aspects, the historical transaction data includes a percentage distribution of a transaction amount for each MCC of the plurality of MCCs of a subset of transactions of the plurality of transactions for a plurality of historical sub-periods of time within the historical period of time, and a duration of a historical sub-period of time is a same duration as the previous period of time.

In some non-limiting embodiments or aspects, the at least one processor is programmed and/or configured to obtain the historical transaction data by generating a zero value for the percentage distribution of the transaction amount for each MCC for a historical sub-period of time that does not include a transaction of the plurality of transactions.

In some non-limiting embodiments or aspects, the previous transaction data includes a percentage distribution of a transaction amount for each MCC of the one or more MCCs of the one or more transactions for the previous period of time.

In some non-limiting embodiments or aspects, the machine learning algorithm includes an isolation forest algorithm, and wherein the machine learning model includes an isolation forest.

According to some non-limiting embodiments or aspects, provided is a computer program product including at least one non-transitory computer-readable medium including program instructions that, when executed by at least one processor, cause the at least one processor to: obtain historical transaction data associated with a time series of a plurality of historical transactions at a merchant system over a historical period of time, the historical transaction data including a plurality of merchant category codes (MCCs) associated with the plurality of historical transactions; apply a difference transform to the historical transaction data to generate transformed data; train a machine learning model by applying a machine learning algorithm to the transformed data, the machine learning model generating an anomaly score associated with the merchant system; obtain previous transaction data associated with one or more previous transactions at the merchant system over a previous period of time after the historical period of time, the previous transaction data including one or more MCCs of the plurality of MCCs associated with the one or more previous transactions; process, using the machine learning model, the previous transaction data to generate the anomaly score associated with the merchant system; and identify, based on the anomaly score and at least one threshold anomaly score, a shift in transaction volume of the merchant system across MCCs for the previous period of time.

In some non-limiting embodiments or aspects, the instructions, when executed by at least one processor, further cause the at least one processor to: receive, during processing of a current transaction at the merchant system in a transaction processing network, current transaction data associated with the current transaction, the current transaction data including an MCC of the plurality of MCCs associated with the current transaction; and determine, based on current transaction data and the anomaly score associated with the merchant system, a risk score associated with the current transaction.

In some non-limiting embodiments or aspects, the instructions, when executed by the at least one processor, further cause the at least one processor to: compare the risk score to at least one threshold risk score; and in response to determining that the risk score satisfies the at least one threshold risk score, deny authorization of the current transaction.

In some non-limiting embodiments or aspects, the historical transaction data includes a percentage distribution of a transaction amount for each MCC of the plurality of MCCs of a subset of transactions of the plurality of transactions for a plurality of historical sub-periods of time within the historical period of time, a duration of a historical sub-period of time is a same duration as the previous period of time, and the previous transaction data includes a percentage distribution of a transaction amount for each MCC of the one or more MCCs of the one or more transactions for the previous period of time.

In some non-limiting embodiments or aspects, the instructions, when executed by the at least one processor, further cause the at least one processor to obtaining the historical transaction data includes generating a zero value for the percentage distribution of the transaction amount for each MCC for a historical sub-period of time that does not include a transaction of the plurality of transactions.

In some non-limiting embodiments or aspects, the machine learning algorithm includes an isolation forest algorithm, and wherein the machine learning model includes an isolation forest.

Further non-limiting embodiments or aspects are set forth in the following numbered clauses:

Clause 1. A computer-implemented method comprising: obtaining, with at least one processor, historical transaction data associated with a time series of a plurality of historical transactions at a merchant system over a historical period of time, wherein the historical transaction data includes a plurality of merchant category codes (MCCs) associated with the plurality of historical transactions; applying, with the at least one processor, a difference transform to the historical transaction data to generate transformed data; training, with the at least one processor, a machine learning model by applying a machine learning algorithm to the transformed data, wherein the machine learning model generates an anomaly score associated with the merchant system; obtaining, with the at least one processor, previous transaction data associated with one or more previous transactions at the merchant system over a previous period of time after the historical period of time, wherein the previous transaction data includes one or more MCCs of the plurality of MCCs associated with the one or more previous transactions; processing, with the at least one processor, using the machine learning model, the previous transaction data to generate the anomaly score associated with the merchant system; and identifying, with the at least one processor, based on the anomaly score and at least one threshold anomaly score, a shift in transaction volume of the merchant system across MCCs for the previous period of time.

Clause 2. The computer-implemented method of clause 1, further comprising: receiving, with the at least one processor, during processing of a current transaction at the merchant system in a transaction processing network, current transaction data associated with the current transaction, wherein the current transaction data includes an MCC of the plurality of MCCs associated with the current transaction; and determining, with the at least one processor, based on current transaction data and the anomaly score associated with the merchant system, a risk score associated with the current transaction.

Clause 3. The computer-implemented method of clauses 1 or 2, further comprising: comparing, with the at least one processor, the risk score to at least one threshold risk score; and in response to determining that the risk score satisfies the at least one threshold risk score, denying, with the at least one processor, authorization of the current transaction.

Clause 4. The computer-implemented method of any of clauses 1-3, wherein the historical transaction data includes a percentage distribution of a transaction amount for each MCC of the plurality of MCCs of a subset of transactions of the plurality of transactions for a plurality of historical sub-periods of time within the historical period of time, and wherein a duration of a historical sub-period of time is a same duration as the previous period of time.

Clause 5. The computer-implemented method of any of clauses 1-4, wherein obtaining the historical transaction data includes generating a zero value for the percentage distribution of the transaction amount for each MCC for a historical sub-period of time that does not include a transaction of the plurality of transactions.

Clause 6. The computer-implemented method of any of clauses 1-5, wherein the previous transaction data includes a percentage distribution of a transaction amount for each MCC of the one or more MCCs of the one or more transactions for the previous period of time.

Clause 7. The computer-implemented method of any of clauses 1-6, wherein the machine learning algorithm includes an isolation forest algorithm, and wherein the machine learning model includes an isolation forest.

Clause 8. A system comprising: at least one processor programmed and/or configured to: obtain historical transaction data associated with a time series of a plurality of historical transactions at a merchant system over a historical period of time, wherein the historical transaction data includes a plurality of merchant category codes (MCCs) associated with the plurality of historical transactions; apply a difference transform to the historical transaction data to generate transformed data; train a machine learning model by applying a machine learning algorithm to the transformed data, wherein the machine learning model generates an anomaly score associated with the merchant system; obtain previous transaction data associated with one or more previous transactions at the merchant system over a previous period of time after the historical period of time, wherein the previous transaction data includes one or more MCCs of the plurality of MCCs associated with the one or more previous transactions; process, using the machine learning model, the previous transaction data to generate the anomaly score associated with the merchant system; and identify, based on the anomaly score and at least one threshold anomaly score, a shift in transaction volume of the merchant system across MCCs for the previous period of time.

Clause 9. The system of clause 8, wherein the at least one processor is further programmed and/or configured to: receive, during processing of a current transaction at the merchant system in a transaction processing network, current transaction data associated with the current transaction, wherein the current transaction data includes an MCC of the plurality of MCCs associated with the current transaction; and determine, based on current transaction data and the anomaly score associated with the merchant system, a risk score associated with the current transaction.

Clause 10. The system of clauses 8 or 9, wherein the at least one processor is further programmed and/or configured to: compare the risk score to at least one threshold risk score; and in response to determining that the risk score satisfies the at least one threshold risk score, deny authorization of the current transaction.

Clause 11. The system of any of clauses 8-10, wherein the historical transaction data includes a percentage distribution of a transaction amount for each MCC of the plurality of MCCs of a subset of transactions of the plurality of transactions for a plurality of historical sub-periods of time within the historical period of time, and wherein a duration of a historical sub-period of time is a same duration as the previous period of time.

Clause 12. The system of any of clauses 8-11, wherein the at least one processor is further programmed and/or configured to obtain the historical transaction data by generating a zero value for the percentage distribution of the transaction amount for each MCC for a historical sub-period of time that does not include a transaction of the plurality of transactions.

Clause 13. The system of any of clauses 8-12, wherein the previous transaction data includes a percentage distribution of a transaction amount for each MCC of the one or more MCCs of the one or more transactions for the previous period of time.

Clause 14. The system of any of clauses 8-13, wherein the machine learning algorithm includes an isolation forest algorithm, and wherein the machine learning model includes an isolation forest.

Clause 15. A computer program product comprising at least one non-transitory computer-readable medium including program instructions that, when executed by at least one processor, cause the at least one processor to: obtain historical transaction data associated with a time series of a plurality of historical transactions at a merchant system over a historical period of time, wherein the historical transaction data includes a plurality of merchant category codes (MCCs) associated with the plurality of historical transactions; apply a difference transform to the historical transaction data to generate transformed data; train a machine learning model by applying a machine learning algorithm to the transformed data, wherein the machine learning model generates an anomaly score associated with the merchant system; obtain previous transaction data associated with one or more previous transactions at the merchant system over a previous period of time after the historical period of time, wherein the previous transaction data includes one or more MCCs of the plurality of MCCs associated with the one or more previous transactions; process, using the machine learning model, the previous transaction data to generate the anomaly score associated with the merchant system; and identify, based on the anomaly score and at least one threshold anomaly score, a shift in transaction volume of the merchant system across MCCs for the previous period of time.

Clause 16. The computer program product of clause 15, wherein the instructions, when executed by the at least one processor, further cause the at least one processor to: receive, during processing of a current transaction at the merchant system in a transaction processing network, current transaction data associated with the current transaction, wherein the current transaction data includes an MCC of the plurality of MCCs associated with the current transaction; and determine, based on current transaction data and the anomaly score associated with the merchant system, a risk score associated with the current transaction.

Clause 17. The computer program product of clauses 15 or 16, wherein the instructions, when executed by the at least one processor, further cause the at least one processor to: compare the risk score to at least one threshold risk score; and in response to determining that the risk score satisfies the at least one threshold risk score, deny authorization of the current transaction.

Clause 18. The computer program product of any of clauses 15-17, wherein the historical transaction data includes a percentage distribution of a transaction amount for each MCC of the plurality of MCCs of a subset of transactions of the plurality of transactions for a plurality of historical sub-periods of time within the historical period of time, wherein a duration of a historical sub-period of time is a same duration as the previous period of time, and wherein the previous transaction data includes a percentage distribution of a transaction amount for each MCC of the one or more MCCs of the one or more transactions for the previous period of time.

Clause 19. The computer program product of any of clauses 15-18, wherein the instructions, when executed by at least one processor, further cause the at least one processor to obtain the historical transaction data by generating a zero value for the percentage distribution of the transaction amount for each MCC for a historical sub-period of time that does not include a transaction of the plurality of transactions.

Clause 20. The computer program product of any of clauses 15-19, wherein the machine learning algorithm includes an isolation forest algorithm, and wherein the machine learning model includes an isolation forest.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of limits. As used in the specification and the claims, the singular form of "a," "an," and "the" include plural referents unless the context clearly dictates otherwise.

BRIEF DESCRIPTION OF THE DRAWINGS

Additional advantages and details are explained in greater detail below with reference to the exemplary embodiments that are illustrated in the accompanying schematic figures, in which.

DESCRIPTION

Figure 1:
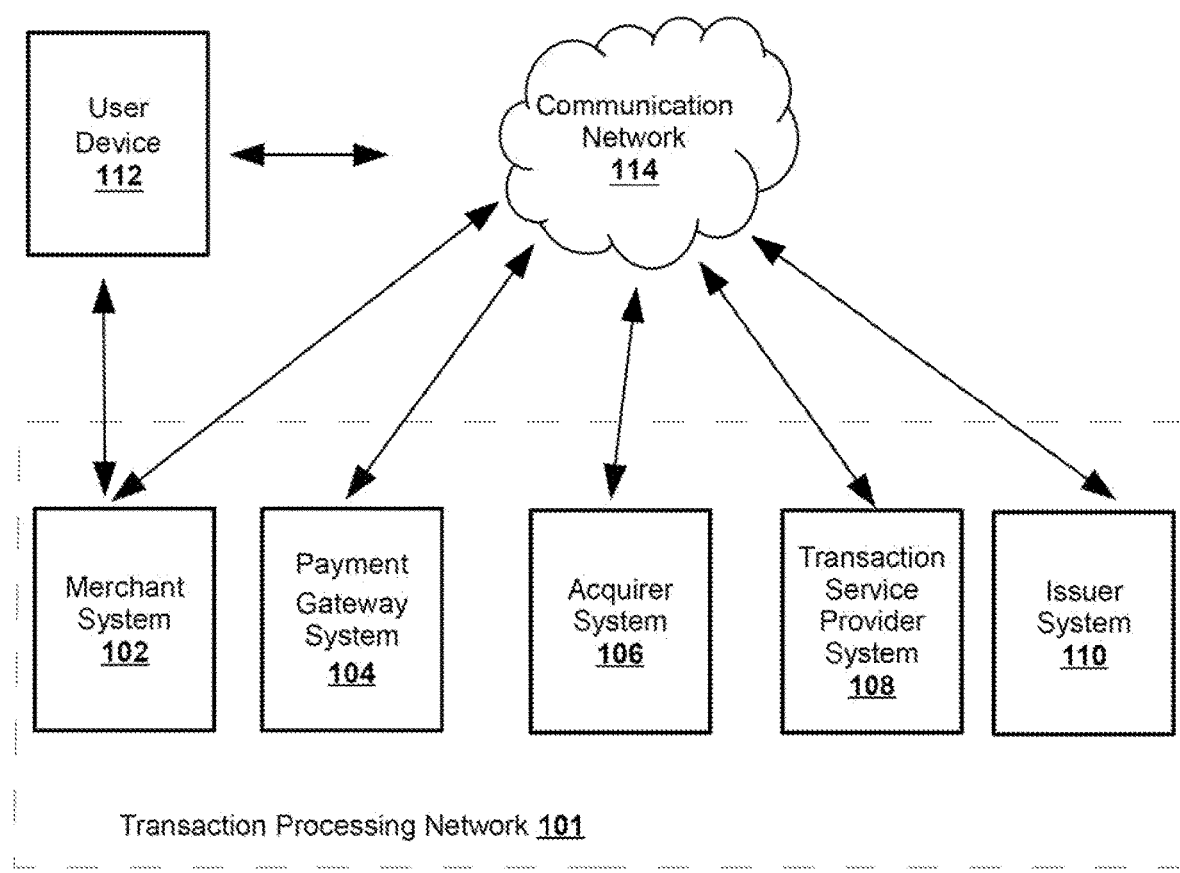
FIG. 1 is a diagram of non-limiting embodiments or aspects of an environment in which systems, devices, products, apparatus, and/or methods, described herein, may be implemented.

It is to be understood that the present disclosure may assume various alternative variations and step sequences, except where expressly specified to the contrary. It is also to be understood that the specific devices and processes illustrated in the attached drawings, and described in the following specification, are simply exemplary and non-limiting embodiments or aspects. Hence, specific dimensions and other physical characteristics related to the embodiments or aspects disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items, and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the term "communication" may refer to the reception, receipt, transmission, transfer, provision, and/or the like, of data (e.g., information, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit processes information received from the first unit and communicates the processed information to the second unit.

It will be apparent that systems and/or methods, described herein, can be implemented in different forms of hardware, software, or a combination of hardware and software. The actual specialized control hardware or software code used to implement these systems and/or methods is not limiting of the implementations. Thus, the operation and behavior of the systems and/or methods are described herein without reference to specific software code, it being understood that software and hardware can be designed to implement the systems and/or methods based on the description herein.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa® or any other entity that processes transactions. The term "transaction processing system" may refer to one or more computing devices operated by or on behalf of a transaction service provider, such as a transaction processing server executing one or more software applications. A transaction processing system may include one or more processors and, in some non-limiting embodiments, may be operated by or on behalf of a transaction service provider.

As used herein, the term "account identifier" may include one or more primary account numbers (PANs), tokens, or other identifiers associated with a customer account. The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifier in one or more data structures (e.g., one or more databases and/or the like) such that they may be used to conduct a transaction without directly using the original account identifier. In some examples, an original account identifier, such as a PAN, may be associated with a plurality of tokens for different individuals or purposes.

As used herein, the terms "issuer institution," "portable financial device issuer," "issuer," or "issuer bank" may refer to one or more entities that provide one or more accounts to a user (e.g., a customer, a consumer, an entity, an organization, and/or the like) for conducting transactions (e.g., payment transactions), such as initiating credit card payment transactions and/or debit card payment transactions. For example, an issuer institution may provide an account identifier, such as a PAN, to a user that uniquely identifies one or more accounts associated with that user. The account identifier may be embodied on a portable financial device, such as a physical financial instrument (e.g., a payment card), and/or may be electronic and used for electronic payments. In some non-limiting embodiments or aspects, an issuer institution may be associated with a bank identification number (BIN) that uniquely identifies the issuer institution. As used herein "issuer institution system" may refer to one or more computer systems operated by or on behalf of an issuer institution, such as a server computer executing one or more software applications. For example, an issuer institution system may include one or more authorization servers for authorizing a payment transaction.

As used herein, the term "merchant" may refer to an individual or entity that provides goods and/or services, or access to goods and/or services, to users (e.g. customers) based on a transaction (e.g. a payment transaction). As used herein, the terms "merchant" or "merchant system" may also refer to one or more computer systems, computing devices, and/or software application operated by or on behalf of a merchant, such as a server computer executing one or more software applications. A "point-of-sale (POS) system," as used herein, may refer to one or more computers and/or peripheral devices used by a merchant to engage in payment transactions with users, including one or more card readers, near-field communication (NFC) receivers, radio frequency identification (RFID) receivers, and/or other contactless transceivers or receivers, contact-based receivers, payment terminals, computers, servers, input devices, and/or other like devices that can be used to initiate a payment transaction. A POS system may be part of a merchant system. A merchant system may also include a merchant plug-in for facilitating online, Internet-based transactions through a merchant webpage or software application. A merchant plug-in may include software that runs on a merchant server or is hosted by a third-party for facilitating such online transactions.

As used herein, the term "mobile device" may refer to one or more portable electronic devices configured to communicate with one or more networks. As an example, a mobile device may include a cellular phone (e.g., a smartphone or standard cellular phone), a portable computer (e.g., a tablet computer, a laptop computer, etc.), a wearable device (e.g., a watch, pair of glasses, lens, clothing, and/or the like), a personal digital assistant (PDA), and/or other like devices. The terms "client device" and "user device," as used herein, refer to any electronic device that is configured to communicate with one or more servers or remote devices and/or systems. A client device or user device may include a mobile device, a network-enabled appliance (e.g., a network-enabled television, refrigerator, thermostat, and/or the like), a computer, a POS system, and/or any other device or system capable of communicating with a network.

As used herein, the term "computing device" may refer to one or more electronic devices configured to process data. A computing device may, in some examples, include the necessary components to receive, process, and output data, such as a processor, a display, a memory, an input device, a network interface, and/or the like. A computing device may be a mobile device. As an example, a mobile device may include a cellular phone (e.g., a smartphone or standard cellular phone), a portable computer, a wearable device (e.g., watches, glasses, lenses, clothing, and/or the like), a PDA, and/or other like devices. A computing device may also be a desktop computer or other form of non-mobile computer.

As used herein, the terms "electronic wallet" and "electronic wallet application" refer to one or more electronic devices and/or software applications configured to initiate and/or conduct payment transactions. For example, an electronic wallet may include a mobile device executing an electronic wallet application, and may further include server-side software and/or databases for maintaining and providing transaction data to the mobile device. An "electronic wallet provider" may include an entity that provides and/or maintains an electronic wallet for a customer, such as Google Pay®, Android Pay®, Apple Pay®, Samsung Pay®, and/or other like electronic payment systems. In some non-limiting examples, an issuer bank may be an electronic wallet provider.

As used herein, the term "payment device" may refer to a portable financial device, an electronic payment device, a payment card (e.g., a credit or debit card), a gift card, a smartcard, smart media, a payroll card, a healthcare card, a wristband, a machine-readable medium containing account information, a keychain device or fob, an RFID transponder, a retailer discount or loyalty card, a cellular phone, an electronic wallet mobile application, a PDA, a pager, a security card, a computer, an access card, a wireless terminal, a transponder, and/or the like. In some non-limiting embodiments or aspects, the payment device may include volatile or nonvolatile memory to store information (e.g., an account identifier, a name of the account holder, and/or the like).

As used herein, the term "server" and/or "processor" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, POS devices, mobile devices, etc.) directly or indirectly communicating in the network environment may constitute a "system." Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

As used herein, the term "acquirer" may refer to an entity licensed by the transaction service provider and/or approved by the transaction service provider to originate transactions using a portable financial device of the transaction service provider. Acquirer may also refer to one or more computer systems operated by or on behalf of an acquirer, such as a server computer executing one or more software applications (e.g., "acquirer server"). An "acquirer" may be a merchant bank, or in some cases, merchant system 102 may be the acquirer. The transactions may include original credit transactions (OCTs) and account funding transactions (AFTs). The acquirer may be authorized by the transaction service provider to sign merchants of service providers to originate transactions using a portable financial device of the transaction service provider. The acquirer may contract with payment facilitators to enable the facilitators to sponsor merchants. The acquirer may monitor compliance of the payment facilitators in accordance with regulations of the transaction service provider. The acquirer may conduct due diligence of payment facilitators and ensure that proper due diligence occurs before signing a sponsored merchant. Acquirers may be liable for all transaction service provider programs that they operate or sponsor. Acquirers may be responsible for the acts of its payment facilitators and the merchants it or its payment facilitators sponsor.

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like operated by or on behalf of a payment gateway.

As used herein, the term "application programming interface" (API) may refer to computer code that allows communication between different systems or (hardware and/or software) components of systems. For example, an API may include function calls, functions, subroutines, communication protocols, fields, and/or the like usable and/or accessible by other systems or other (hardware and/or software) components of systems.

As used herein, the term "user interface" or "graphical user interface" refers to a generated display, such as one or more graphical user interfaces (GUIs) with which a user may interact, either directly or indirectly (e.g., through a keyboard, mouse, touchscreen, etc.).

Accurate detection of merchant data shifts across merchant category codes (MCCs) encounters problems of dynamic merchant behaviors, high dimensionality, and seasonality and trends in data. For example, merchants may behave dynamically by appearing and disappearing from time to time (e.g., by not initiating or processing transactions from time to time, etc.), sometimes for a long period of time (e.g., months, etc.) and sometimes for a short period of time (e.g., weeks, etc.), which introduces a large number of missing values into a time series transaction dataset for some merchants. For example, for each merchant, there are a large number of MCCs (e.g., MCCs may vary from 1 to 89 for each merchant, etc.), which renders the data very high dimensional. For example, events may cause data shifts, such as Christmas, Thanksgiving, and/or the COVID-19 pandemic, which may make it more difficult to distinguish between legitimate and illegitimate data shifts. In this way, there is no existing mechanism for detecting high-risk behavior merchants by monitoring transaction volume shift of the merchants between MCC codes, which may render existing risk scoring models and/or fraud detection systems in electronic payment networks less efficient and/or less accurate.

Provided are improved systems, devices, products, apparatus, and/or methods that obtain historical transaction data associated with a time series of a plurality of historical transactions at a merchant system over a historical period of time, wherein the historical transaction data includes a plurality of MCCs associated with the plurality of historical transactions; apply a difference transform to the historical transaction data to generate transformed data; train a machine learning model by applying a machine learning algorithm to the transformed data, wherein the machine learning model generates an anomaly score associated with the merchant system; obtain previous transaction data associated with one or more previous transactions at the merchant system over a previous period of time after the historical period of time, wherein the previous transaction data includes one or more MCCs of the plurality of MCCs associated with the one or more previous transactions; process, using the machine learning model, the previous transaction data to generate the anomaly score associated with the merchant system; and identify, based on the anomaly score and at least one threshold anomaly score, a shift in transaction volume of the merchant system across MCCs for the previous period of time.

In this way, non-limiting embodiments or aspects of the present disclosure solve the technical problems of dynamic merchant behaviors, high dimensionality, and seasonality and trends in data associated with detection of merchant data shifts across merchant category codes, thereby enabling existing risk scoring models and/or fraud detection systems in electronic payment networks to be more efficient and/or more accurate.

Referring now to FIG. 1, FIG. 1 is a diagram of an example environment 100 in which devices, systems, methods, and/or products described herein, may be implemented.

As shown in FIG. 1, environment 100 includes transaction processing network 101, which may include merchant system 102, payment gateway system 104, acquirer system 106, transaction service provider system 108, issuer system 110, user device 112, and/or communication network 114. Transaction processing network 101, merchant system 102, payment gateway system 104, acquirer system 106, transaction service provider system 108, issuer system 110, and/or user device 112 may interconnect (e.g., establish a connection to communicate, etc.) via wired connections, wireless connections, or a combination of wired and wireless connections.

Merchant system 102 may include one or more devices capable of receiving information and/or data from payment gateway system 104, acquirer system 106, transaction service provider system 108, issuer system 110, and/or user device 112 via communication network 114 and/or communicating information and/or data to payment gateway system 104, acquirer system 106, transaction service provider system 108, issuer system 110, and/or user device 112 via communication network 114. Merchant system 102 may include a device capable of receiving information and/or data from user device 112 via a communication connection (e.g., an NFC communication connection, an RFID communication connection, a Bluetooth® communication connection, etc.) with user device 112, and/or communicating information and/or data to user device 112 via the communication connection. For example, merchant system 102 may include a computing device, such as a server, a group of servers, a client device, a group of client devices, and/or other like devices. In some non-limiting embodiments or aspects, merchant system 102 may be associated with a merchant as described herein. In some non-limiting embodiments or aspects, merchant system 102 may include one or more devices, such as computers, computer systems, and/or peripheral devices capable of being used by a merchant to conduct a payment transaction with a user. For example, merchant system 102 may include a POS device and/or a POS system.

Payment gateway system 104 may include one or more devices capable of receiving information and/or data from merchant system 102, acquirer system 106, transaction service provider system 108, issuer system 110, and/or user device 112 via communication network 114 and/or communicating information and/or data to merchant system 102, acquirer system 106, transaction service provider system 108, issuer system 110, and/or user device 112 via communication network 114. For example, payment gateway system 104 may include a computing device, such as a server, a group of servers, and/or other like devices. In some non-limiting embodiments or aspects, payment gateway system 104 is associated with a payment gateway as described herein.

Acquirer system 106 may include one or more devices capable of receiving information and/or data from merchant system 102, payment gateway system 104, transaction service provider system 108, issuer system 110, and/or user device 112 via communication network 114 and/or communicating information and/or data to merchant system 102, payment gateway system 104, transaction service provider system 108, issuer system 110, and/or user device 112 via communication network 114. For example, acquirer system 106 may include a computing device, such as a server, a group of servers, and/or other like devices. In some non-limiting embodiments or aspects, acquirer system 106 may be associated with an acquirer as described herein.

Transaction service provider system 108 may include one or more devices capable of receiving information and/or data from merchant system 102, payment gateway system 104, acquirer system 106, issuer system 110, and/or user device 112 via communication network 114 and/or communicating information and/or data to merchant system 102, payment gateway system 104, acquirer system 106, issuer system 110, and/or user device 112 via communication network 114. For example, transaction service provider system 108 may include a computing device, such as a server (e.g., a transaction processing server, etc.), a group of servers, and/or other like devices. In some non-limiting embodiments or aspects, transaction service provider system 108 may be associated with a transaction service provider as described herein. In some non-limiting embodiments or aspects, transaction service provider system 108 may include and/or access one or more internal and/or external databases including transaction data.

Issuer system 110 may include one or more devices capable of receiving information and/or data from merchant system 102, payment gateway system 104, acquirer system 106, transaction service provider system 108, and/or user device 112 via communication network 114 and/or communicating information and/or data to merchant system 102, payment gateway system 104, acquirer system 106, transaction service provider system 108, and/or user device 112 via communication network 114. For example, issuer system 110 may include a computing device, such as a server, a group of servers, and/or other like devices. In some non-limiting embodiments or aspects, issuer system 110 may be associated with an issuer institution as described herein. For example, issuer system 110 may be associated with an issuer institution that issued a payment account or instrument (e.g., a credit account, a debit account, a credit card, a debit card, etc.) to a user (e.g., a user associated with user device 112, etc.).

In some non-limiting embodiments or aspects, transaction processing network 101 includes a plurality of systems in a communication path for processing a transaction. For example, transaction processing network 101 can include merchant system 102, payment gateway system 104, acquirer system 106, transaction service provider system 108, and/or issuer system 110 in a communication path (e.g., a communication path, a communication channel, a communication network, etc.) for processing an electronic payment transaction. As an example, transaction processing network 101 can process (e.g., initiate, conduct, authorize, etc.) an electronic payment transaction via the communication path between merchant system 102, payment gateway system 104, acquirer system 106, transaction service provider system 108, and/or issuer system 110.

User device 112 may include one or more devices capable of receiving information and/or data from merchant system 102, payment gateway system 104, acquirer system 106, transaction service provider system 108, and/or issuer system 110 via communication network 114 and/or communicating information and/or data to merchant system 102, payment gateway system 104, acquirer system 106, transaction service provider system 108, and/or issuer system 110 via communication network 114. For example, user device 112 may include a client device and/or the like. In some non-limiting embodiments or aspects, user device 112 may be capable of receiving information (e.g., from merchant system 102, etc.) via a short range wireless communication connection (e.g., an NFC communication connection, an RFID communication connection, a Bluetooth® communication connection, and/or the like), and/or communicating information (e.g., to merchant system 102, etc.) via a short range wireless communication connection.

In some non-limiting embodiments or aspects, user device 112 may include one or more applications associated with user device 112, such as an application stored, installed, and/or executed on user device 112 (e.g., a mobile device application, a native application for a mobile device, a mobile cloud application for a mobile device, an electronic wallet application, a peer-to-peer payment transfer application, a merchant application, an issuer application, etc.).

Communication network 114 may include one or more wired and/or wireless networks. For example, communication network 114 may include a cellular network (e.g., a long-term evolution (LTE) network, a third generation (3G) network, a fourth generation (4G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of these or other types of networks.

The number and arrangement of devices and systems shown in FIG. 1 is provided as an example. There may be additional devices and/or systems, fewer devices and/or systems, different devices and/or systems, or differently arranged devices and/or systems than those shown in FIG. 1. Furthermore, two or more devices and/or systems shown in FIG. 1 may be implemented within a single device and/or system, or a single device and/or system shown in FIG. 1 may be implemented as multiple, distributed devices and/or systems. Additionally or alternatively, a set of devices and/or systems (e.g., one or more devices or systems) of environment 100 may perform one or more functions described as being performed by another set of devices and/or systems of environment 100.

Figure 2:
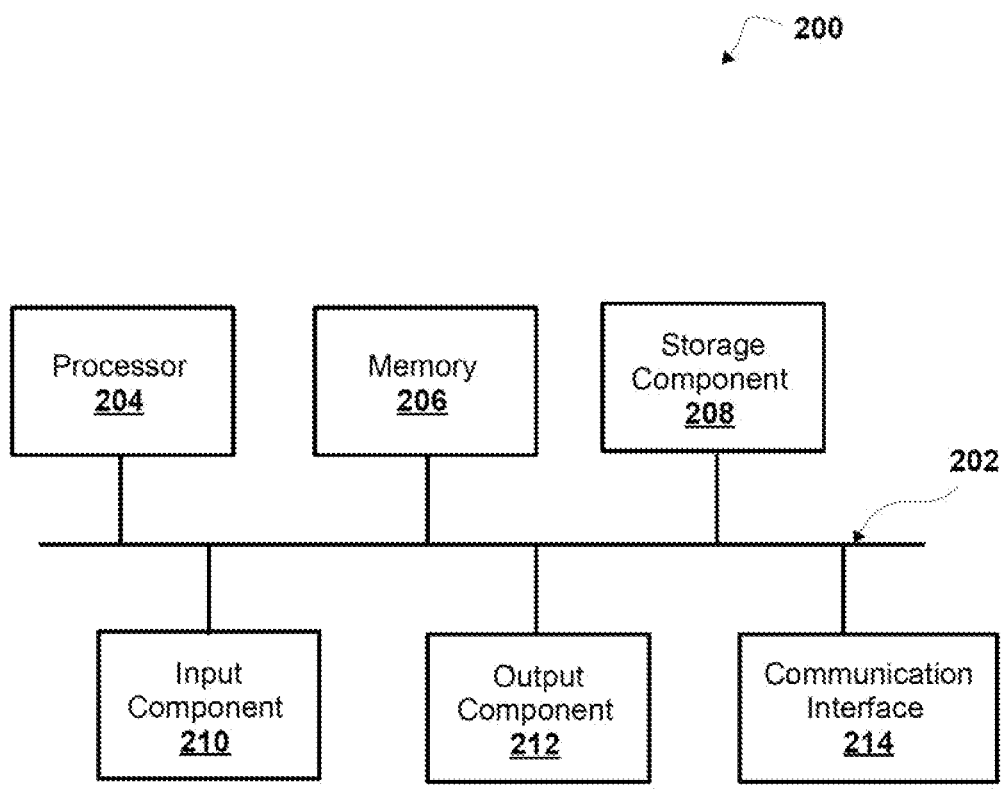
FIG. 2 is a diagram of non-limiting embodiments or aspects of components of one or more devices and/or one or more systems of FIG. 1.

Referring now to FIG. 2, FIG. 2 is a diagram of example components of a device 200. Device 200 may correspond to one or more devices of merchant system 102, one or more devices of payment gateway system 104, one or more devices of acquirer system 106, one or more devices of transaction service provider system 108, one or more devices of issuer system 110, and/or user device 112 (e.g., one or more devices of a system of user device 112, etc.). In some non-limiting embodiments or aspects, one or more devices of merchant system 102, one or more devices of payment gateway system 104, one or more devices of acquirer system 106, one or more devices of transaction service provider system 108, one or more devices of issuer system 110, and/or user device 112 (e.g., one or more devices of a system of user device 112, etc.) may include at least one device 200 and/or at least one component of device 200. As shown in FIG. 2, device 200 may include bus 202, processor 204, memory 206, storage component 208, input component 210, output component 212, and communication interface 214.

Bus 202 may include a component that permits communication among the components of device 200. In some non-limiting embodiments or aspects, processor 204 may be implemented in hardware, software, or a combination of hardware and software. For example, processor 204 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 206 may include random access memory (RAM), read-only memory (ROM), and/or another type of dynamic or static storage device (e.g., flash memory, magnetic memory, optical memory, etc.) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touch screen display, a keyboard, a keypad, a mouse, a button, a switch, a microphone, etc.). Additionally or alternatively, input component 210 may include a sensor for sensing information (e.g., a global positioning system (GPS) component, an accelerometer, a gyroscope, an actuator, etc.). Output component 212 may include a component that provides output information from device 200 (e.g., a display, a speaker, one or more light-emitting diodes (LEDs), etc.).

Communication interface 214 may include a transceiver-like component (e.g., a transceiver, a separate receiver and transmitter, etc.) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RE) interface, a universal serial bus (USB) interface, a Wi-Fi® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A non-transitory memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally or alternatively, hardwired circuitry may be used in place of or in combination with software instructions to perform one or more processes described herein. Thus, embodiments or aspects described herein are not limited to any specific combination of hardware circuitry and software.

Memory 206 and/or storage component 208 may include data storage or one or more data structures (e.g., a database, etc.). Device 200 may be capable of receiving information from, storing information in, communicating information to, or searching information stored in the data storage or one or more data structures in memory 206 and/or storage component 208.

The number and arrangement of components shown in FIG. 2 are provided as an example. In some non-limiting embodiments or aspects, device 200 may include additional components, fewer components, different components, or differently arranged components than those shown in FIG. 2. Additionally or alternatively, a set of components (e.g., one or more components) of device 200 may perform one or more functions described as being performed by another set of components of device 200.

Figure 3A:
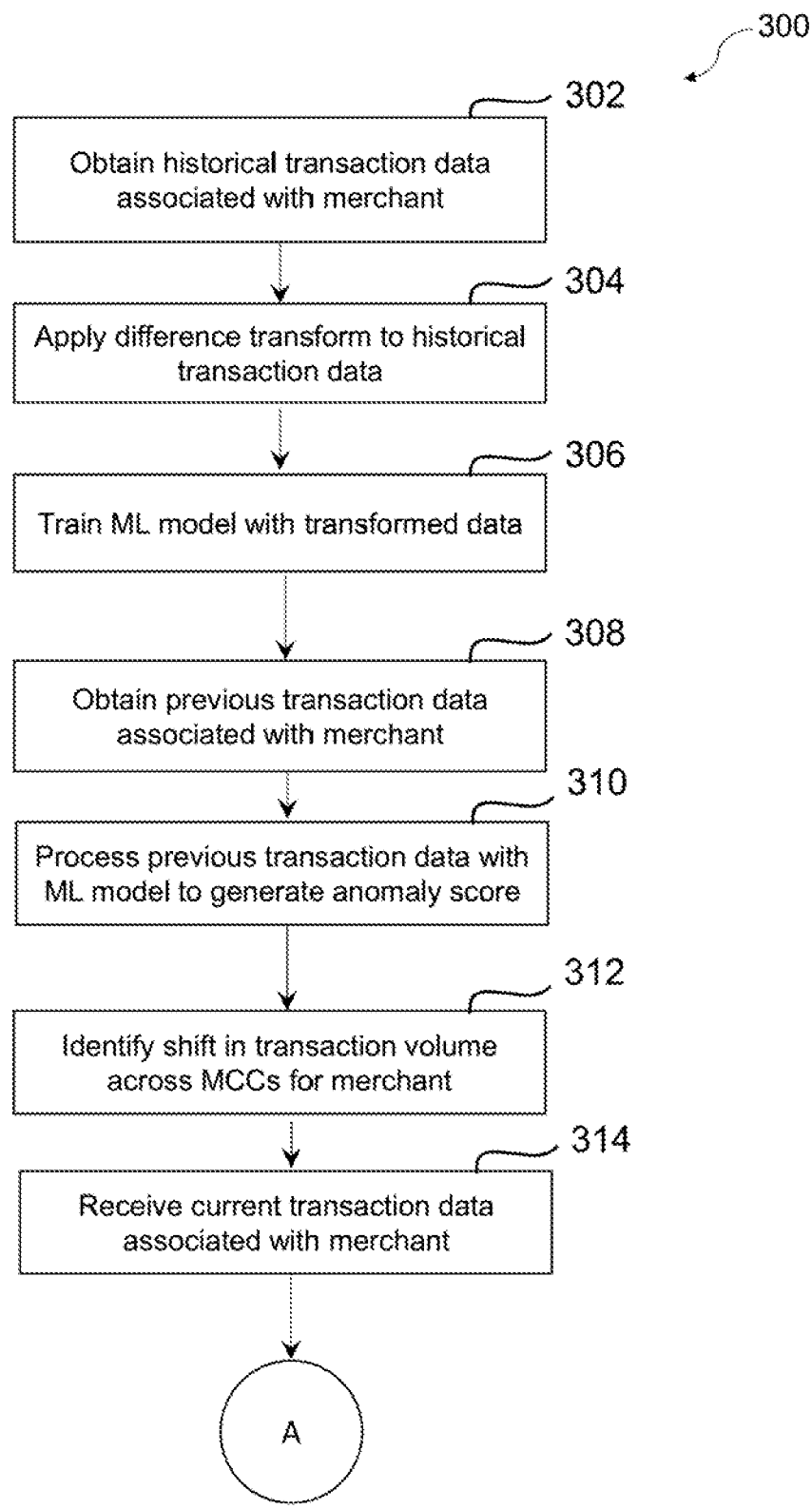
FIGS. 3A and 3B are flowcharts of non-limiting embodiments or aspects of a process for detecting merchant data shifts.
Figure 3B:
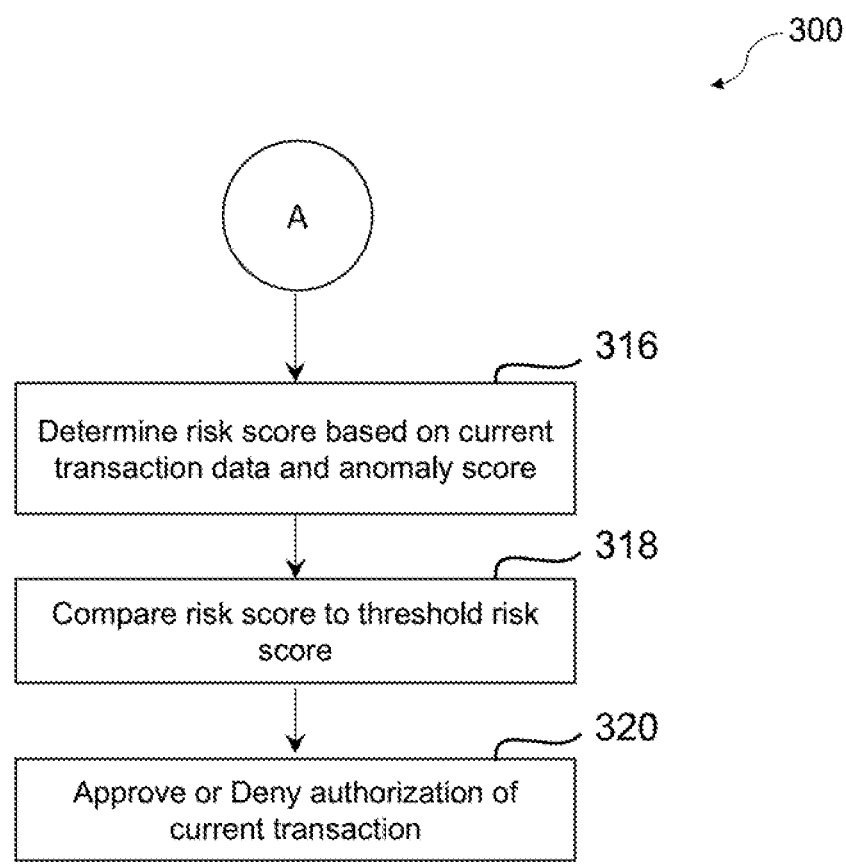

Referring now to FIGS. 3A and 3B, FIGS. 3A and 3B are flowcharts of non-limiting embodiments or aspects of a process 300 for detecting merchant data shifts. In some non-limiting embodiments or aspects, one or more of the steps of process 300 may be performed (e.g., completely, partially, etc.) by transaction service provider system 108 (e.g., one or more devices of transaction service provider system 108). In some non-limiting embodiments or aspects, one or more of the steps of process 300 may be performed (e.g., completely, partially, etc.) by another device or a group of devices separate from or including transaction service provider system 108, such as, (e.g., one or more devices of merchant system 102), payment gateway system 104 (e.g., one or more devices of payment gateway system 104), acquirer system 106 (e.g., one or more devices of acquirer system 106), transaction service provider system 108 (e.g., one or more devices of transaction service provider system 108, etc.), issuer system 110 (e.g., one or more devices of issuer system 110), and/or user device 112.

As shown in FIG. 3A, at step 302, process 300 includes obtaining historical transaction data associated with a merchant. For example, transaction service provider system 108 may obtain historical transaction data associated with a time series of a plurality of historical transactions at merchant system 102 over a historical period of time (e.g., over a prior year or years, etc.). The historical transaction data (e.g., clearing and settlement data, training data, etc.) may include a plurality of MCCs associated with the plurality of historical transactions and/or a plurality of transaction amounts associated with the plurality of transactions. A time series of a plurality of historical transactions may include data points for the plurality of historical transactions indexed in time order (e.g., a sequence of data points taken at successive equally spaced points in time, a sequence of discrete time data, etc.). For example, transaction service provider system 108 may generate or assign a zero value for data points that are not associated with a transaction at merchant system 102.

In some non-limiting embodiments or aspects, transaction service provider system 108 may obtain historical transaction data associated with a plurality of time series of a plurality of historical transactions at a plurality of merchant systems 102 over a historical period of time (e.g., over a prior year or years, etc.). For example, the historical transaction data (e.g., clearing and settlement data, training data, etc.) may include a plurality of MCCs associated with the plurality of historical transactions, a plurality of transaction amounts associated with the plurality of historical transactions, and/or a plurality of merchant identifiers associated with the plurality of historical transaction. As an example, transaction service provider system 108 may receive, for each merchant system 102 of the plurality of merchant systems 102, a time series of a plurality of historical transactions at that merchant system 102 over the historical period of time.

Transaction data (e.g., historical transaction data, previous transaction data, current transaction data, etc.) may include parameters associated with a transaction, such as an account identifier (e.g., a PAN, etc.), a transaction amount, a transaction date and time, a type of products and/or services associated with the transaction, a conversion rate of currency, a type of currency, a merchant type, a merchant name, a merchant location, a merchant category group (MCG), an MCC, and/or the like.

MCCs may be used to classify a merchant by the type of goods or services the merchant provides. MCCs can be assigned by merchant type (e.g., one for hotels, one for office supply stores, etc.), or by merchant name (e.g., 3000 for United Airlines). For example, an MCC may include a four-digit number listed in ISO 18245 for retail financial services used to classify a business by the types of goods or services it provides. MCGs may include general categories under which merchant category codes fall, such as Travel, Lodging, Dining and Entertainment, Vehicle Expenses, Office Services and Merchandise, Cash Advance, Other, and/or the like.

Historical transaction data may include a percentage distribution of a transaction amount (e.g., a payment amount, a summed transaction amount, etc.) for each MCC of the plurality of MCCs of a subset of transactions of the plurality of transactions for a plurality of historical sub-periods of time within the historical period of time. For example, transaction service provider system 108 may divide the historical time period (e.g., a year, etc.) into a plurality of historical sub-periods (e.g., weeks, etc.) and determine, based on the historical transaction data, a percentage distribution per MCC for a merchant for each sub-period (e.g., a percentage of a weekly transaction amount assigned to each MCC for the merchant for that week, etc.). As an example, historical transaction data may include a percentage difference of a transaction amount between MCCs for a merchant. In such an example, transaction service provider system 108 may generate or assign a zero value for the percentage distribution of the transaction amount for each MCC for a historical sub-period of time that does not include a transaction of the plurality of transactions.

As shown in FIG. 3A, at step 304, process 300 includes applying a difference transform to a time series of historical transaction data. For example, transaction service provider system 108 may apply a difference transform to the historical transaction data to generate transformed data. As an example, transaction service provider system 108 may apply, for each merchant system 102 of the plurality of merchant systems 102, a difference transform to the time series of the plurality of historical transactions at that merchant system 102 over the historical period of time, to generate transformed data associated with each merchant system 102.

A time series dataset may contain a trend (e.g., a continued increase or decrease in the series over time, etc.), and non-limiting embodiments or aspects of the present disclosure recognize a benefit in identifying, modeling, and/or removing trend information from transaction parameters in the historical transaction data to remove the trends and make the data stationary. In such an example, transaction service provider system 108 may apply the difference transform to remove the dependence of the time series of historical transactions on time (e.g., to remove temporal dependence, etc.), thereby removing trends and seasonality from the time series. For example, a difference transform may subtract a value of previous observation, transaction parameters, or data point (e.g., a transaction amount, a percentage distribution of a transaction amount per MCC, etc.) from a value of a current observation transaction parameter, or data point in a time series to determine a difference therebetween (e.g., a transformed transaction parameter, etc.): difference(t)=observation(t)−observation(t−1).

As shown in FIG. 3A, at step 306, process 300 includes training a machine learning model with transformed data. For example, transaction service provider system 108 may train a machine learning model by applying a machine learning algorithm to the transformed data, wherein the machine learning model generates an anomaly score associated with merchant system 102. As an example, transaction service provider system 108 may train a machine learning model by applying a machine learning algorithm to one or more transformed transaction parameters. In such an example, the machine learning model may generate, for merchant system 102, an anomaly score. In such an example, a machine learning algorithm/model may include at least one of the following models: a deep learning model (e.g., a long short-term memory (LSTM) a recurrent neural network (RNN), etc.), a random forest regressor, an isolation forest, a density-based spatial clustering of applications with noise (DBSCAN) algorithm, an autoregressive integrated moving average (ARIMA) model, or any combination thereof. Transaction service provider system 108 may provide and/or store the trained machine learning model.

In some non-limiting embodiments or aspects, transaction service provider system 108 may train, for each merchant system 102 of the plurality of merchant systems 102, a machine learning model associated with that merchant system 102 by applying a machine learning algorithm to the transformed data associated with that merchant system 102, wherein the machine learning model generates an anomaly score associated with that merchant system 102.

Figure 4:
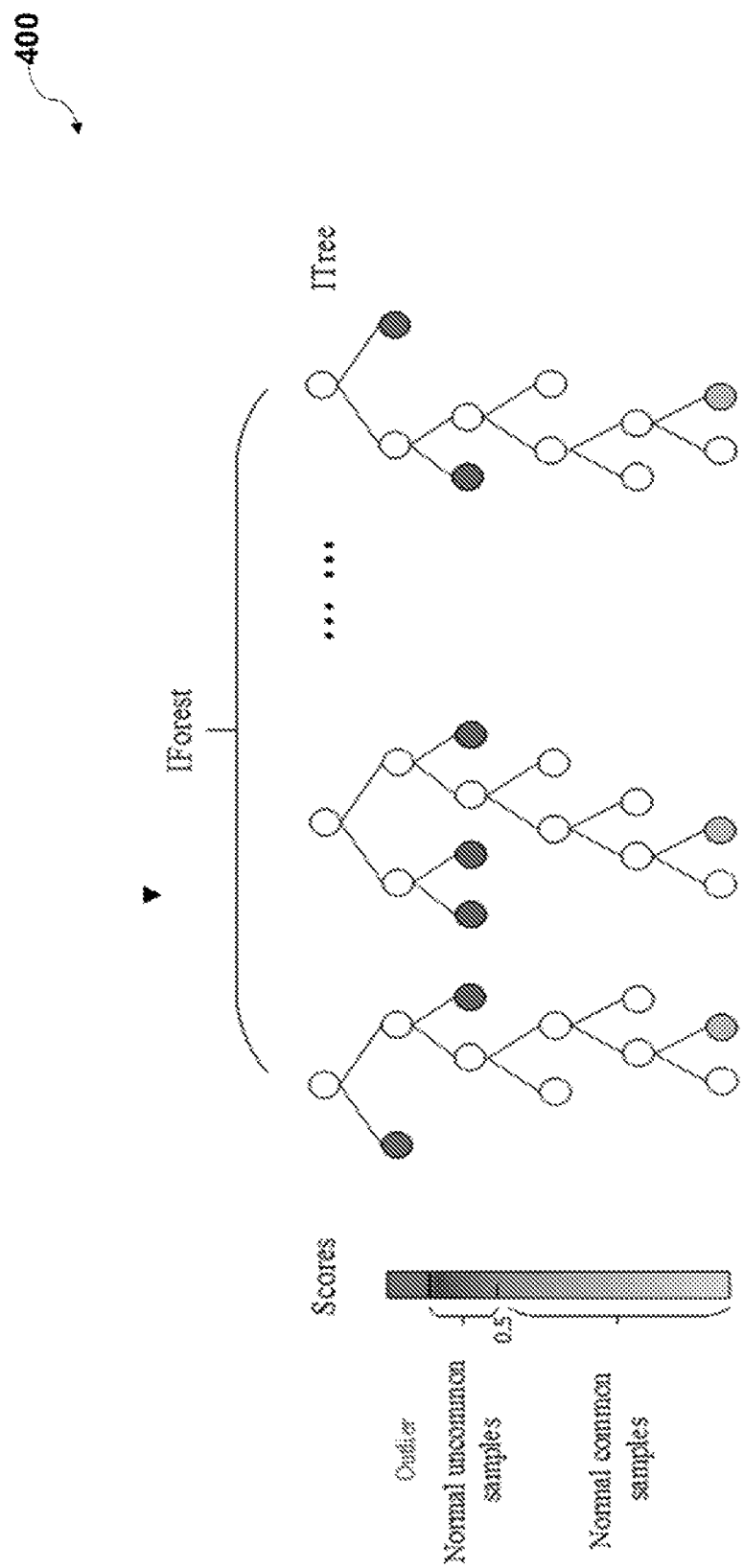
FIG. 4 is a diagram of an implementation of non-limiting embodiments or aspects of an isolation forest.

In some non-limiting embodiments or aspects, the machine learning algorithm includes an isolation forest algorithm, and the machine learning model includes an isolation forest. For example, and referring also to FIG. 4, which is a diagram of an implementation 400 of non-limiting embodiments or aspects of an isolation forest, an isolation forest is an unsupervised learning algorithm for anomaly detection that works on the principle of isolating anomalies, instead of more common techniques of profiling normal points. In the isolation forest algorithm, there is the tendency of anomalous instances in a dataset to be easier to separate from the rest of the sample (isolate), compared to normal points. In order to isolate a data point, the algorithm recursively generates partitions on the sample by randomly selecting an attribute and then randomly selecting a split value for the attribute, between the minimum and maximum values allowed for that attribute. For example, data is sub-sampled and processed in a tree structure based on random cuts in the values of randomly selected features in the dataset. Deeper tree branches correspond to samples being less likely to be anomalous, while shorter tree branches indicate anomaly. An isolation forest is described by Liu et al. in the paper entitled "Isolation Forest", in Proc. 8th IEEE Int. Conf. Data Mining, Dec. 2008, pp. 413-422, the entire contents of which is hereby incorporated by reference.

Transaction service provider system 108 may train an isolation forest by applying an isolation forest algorithm to the transformed data, wherein the isolation forest generates an anomaly score associated with merchant system 102. As an example, transaction service provider system 108 may train an isolation forest by applying an isolation forest algorithm to one or more transformed transaction parameters (e.g., a transformed percentage difference of a transaction amount between MCCs, etc.). For example, the isolation forest may generate, for each historical sub-period of time of the plurality of historical sub-periods of time (e.g., for each week, etc.), an anomaly score associated with merchant system 102. In such an example, one or more hyperparameter of the isolation forest may be tuned to be representative of conditions in which merchant system 102 operates (e.g., selected based on hyperparameter tuning, etc.).

As shown in FIG. 3A, at step 308, process 300 includes obtaining previous transaction data associated with a merchant. For example, transaction service provider system 108 may obtain previous transaction data associated with one or more previous transactions at merchant system 102 during a previous period of time after the historical period of time. As an example, the previous transaction data may include one or more MCCs of the plurality of MCCs associated with the one or more previous transactions. In such an example, a duration of a historical sub-period of time (e.g., a week, etc.) may be a same duration as the previous period of time (e.g., a week, etc.).

In some non-limiting embodiments or aspects, transaction service provider system 108 may obtain, for each merchant system 102 of the plurality of merchant systems 102, previous transaction data associated with one or more previous transactions at that merchant system 102 during the previous period of time after the historical period of time. For example, the previous transaction data may include one or more MCCs of the plurality of MCCs associated with a plurality of transactions at the plurality of merchant systems 102, a plurality of transaction amounts associated with the plurality of transactions, and/or a plurality of merchant identifiers associated with the plurality of merchant systems 102.

As shown in FIG. 3A, at step 310, process 300 includes processing previous transaction data with a machine learning model to generate an anomaly score. For example, transaction service provider system 108 may process, using the machine learning model, the previous transaction data to generate the anomaly score associated with merchant system 102. As an example, transaction service provider system 108 may provide, as input to the trained machine learning model, one or more transaction parameters (e.g., a percentage difference of a transaction amount between MCCs, etc.), and receive, as output from the trained machine learning model, an anomaly score associated with merchant system 102. In such an example, transaction service provider system 108 may provide, as input to the isolation forest model, one or more transaction parameters (e.g., a percentage difference of a transaction amount between MCCs, etc.), and receive, as output from the trained isolation forest model, an anomaly score associated with merchant system 102.

In some non-limiting embodiments or aspects, transaction service provider system 108 may process, for each merchant system 102 of the plurality of merchant systems 102, using the machine learning model associated with that merchant system 102, the previous transaction data associated with that merchant system 102 to generate the anomaly score associated with that merchant system 102. For example, transaction service provider system 108 may provide, for each merchant system 102, as input to an isolation forest model generated for that merchant system 102, one or more transaction parameters (e.g., a percentage difference of a transaction amount between MCCs, etc.) associated with the one or more previous transactions at that merchant system 102 and receive, as output from the isolation forest model, an anomaly score associated with that merchant system 102.

Figure 5:
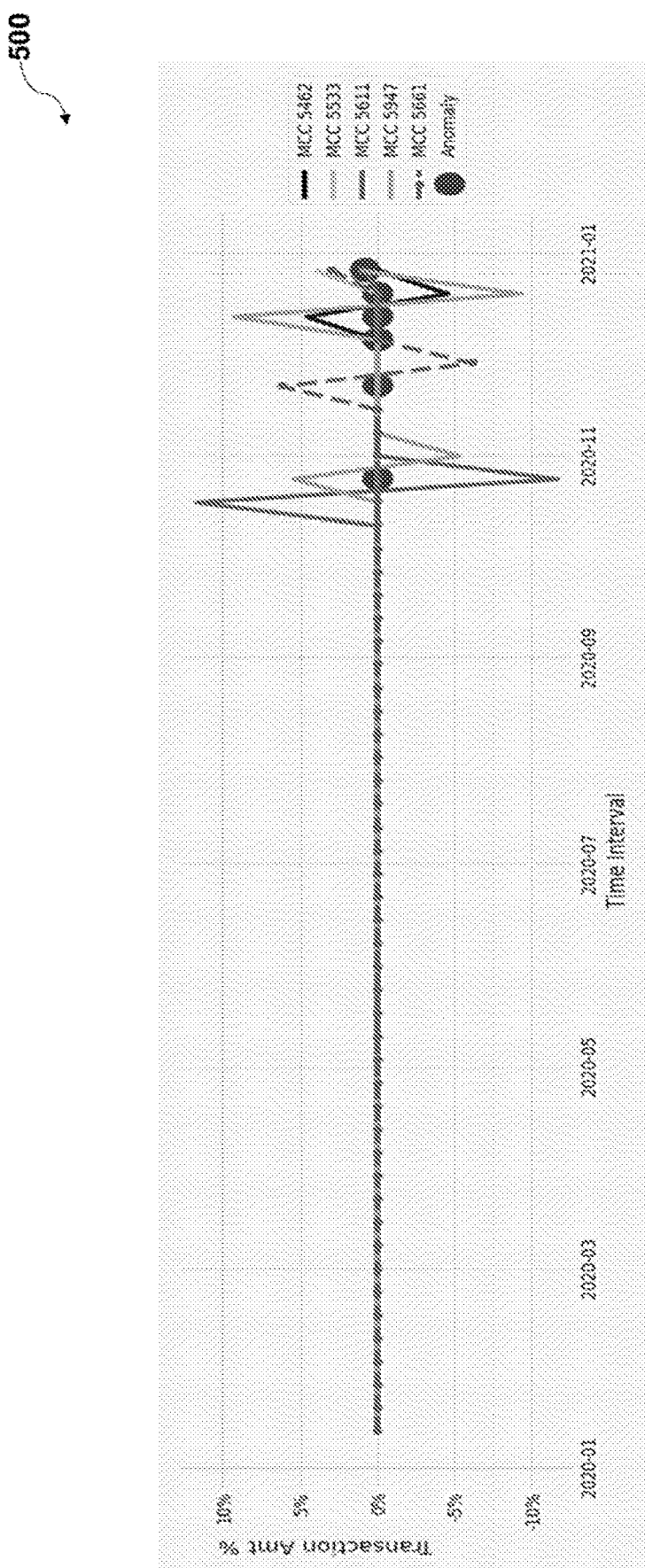
FIG. 5 is a graph of example abnormal data shifts identified for an example merchant.

As shown in FIG. 3A, at step 312, process 300 includes identifying a shift in transaction volume across MCCs for a merchant. For example, transaction service provider system 108 may identify, based on the anomaly score, a shift in transaction volume of merchant system 102 across MCCs for the previous period of time. As an example, transaction service provider system 108 may identify, based on the anomaly score and at least one threshold anomaly score, a shift in transaction volume of merchant system 102 across MCCs for the previous period of time. In such an example, transaction service provider system 108 may compare the anomaly score to the at least one threshold anomaly score and, in response to determining that the anomaly score satisfies the at least one threshold anomaly score, identify a shift in transaction volume of merchant system 102 across MCCs for the previous period of time. For example, and referring also to FIG. 5, which is a graph 500 of example abnormal data shifts identified for an example merchant, the x-axis shows time intervals and the y-axis shows the transaction amount variations compared to previous time intervals for example MCCs used by the example merchant. The lines on the right of the picture shows the MCC payment volumes of the example merchant and the circles show the detected anomalies. As shown in FIG. 5, until October 2020, the variation of the MCCs for the example merchant is zero, and after October 2020 the process 300 for detecting merchant data shifts identifies anomalies (e.g., transaction volume shifts across MCCs, etc.) associated with the merchant.

In some non-limiting embodiments or aspects, transaction service provider system 108 may determine, for each merchant system 102 of the plurality of merchant systems 102, based on the anomaly score associated with that merchant system 102, whether a shift in transaction volume of that merchant system 102 across MCCs for the previous period of time has occurred.

In response to identifying a shift in transaction volume of merchant system 102 across MCCs for the previous period of time, transaction service provider system 108 may provide an alert to risk prediction model, a fraud prediction model, and/or issuer system 110 identifying merchant system 102 as a high-risk merchant system for MCC gaming/shifting. In some non-limiting embodiments or aspects, transaction service provider system 108 may provide a report including a list of which merchant systems of the plurality of merchant systems 102 have had a shift in transaction volume across MCCs for the previous period of time. In such an example, the report may include transaction data associated with transactions associated with the merchants listed in the report.

As shown in FIG. 3A, at step 314, process 300 includes receiving current transaction data associated with a merchant. For example, transaction service provider system 108 may receive, during processing of a current transaction at merchant system 102 in transaction processing network 101, current transaction data associated with the current transaction (e.g., merchant name, MCC, transaction amount, etc.), wherein the current transaction data includes an MCC of the plurality of MCCs associated with the current transaction. As an example, after identifying a shift in transaction volume of merchant system 102 across MCCs (e.g., after identifying merchant system 102 as a high-risk merchant system for MCC gaming/shifting, etc.), transaction service provider system 108 (and/or issuer system 110) may receive an authorization request for a current transaction in transaction processing network 101.

As shown in FIG. 3B, at step 316, process 300 includes determining a risk score based on current transaction data and an anomaly score. For example, transaction service provider system 108 may determine, based on the current transaction data and the anomaly score associated with merchant system 102, a risk score associated with the current transaction. As an example, transaction service provider system 108 may input, to a risk prediction model (e.g., a fraud prediction model, etc.), one or more transaction parameters associated with the current transaction (e.g., merchant name, MCC, transaction amount, etc.) and the anomaly score associated with merchant system 102, and receive, as output from the risk prediction model, a risk score associated with the current transaction (e.g. a probability that the current transaction includes an incorrect or shifted MCC, a probability that the current transaction is a fraudulent transaction, etc.).

As shown in FIG. 3B, at step 318, process 300 includes comparing a risk score to a threshold risk score. For example, transaction service provider system 108 may compare the risk score associated with the current transaction to at least one threshold risk score.

As shown in FIG. 3B, at step 320, process 300 includes approving or denying authorization of a current transaction. For example, in response to determining that the risk score satisfies the at least one threshold risk score, transaction service provider system 108 may deny authorization of the current transaction. As an example, in response to determining that the risk score satisfies the at least one threshold risk score, transaction service provider system 108 may determine that the current transaction includes an incorrect or shifted MCC and/or that the current transaction is a fraudulent transaction. As an example, in response to determining that the risk score fails to satisfy the at least one threshold risk score, transaction service provider system 108 may authorize authorization of the current transaction.

Although non-limiting embodiments or aspects of the present disclosure have been described herein primarily with respect to identifying a shift in transaction volume of a merchant system across MCCs, non-limiting embodiments or aspects of the present disclosure are not limited thereto and may include embodiments or aspects in which a shift in any data parameter (e.g., any transaction parameter, etc.) across any data category (e.g., any merchant category, etc.) associated with a system may be identified using the process 300 for detecting merchant data shifts described herein. For example, non-limiting embodiments or aspects of the present disclosure may use the process 300 for detecting merchant data shifts described herein to identify a shift in transaction volume of merchant system across MCGs.

Although embodiments or aspects have been described in detail for the purpose of illustration and description, it is to be understood that such detail is solely for that purpose and that embodiments or aspects are not limited to the disclosed embodiments or aspects, but, on the contrary, are intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect. In fact, any of these features can be combined in ways not specifically recited in the claims and/or disclosed in the specification. Although each dependent claim listed below may directly depend on only one claim, the disclosure of possible implementations includes each dependent claim in combination with every other claim in the claim set.

What is claimed is:

1. A computer-implemented method comprising:
   obtaining, with at least one processor, historical transaction data associated with a time series of a plurality of historical transactions at a merchant system over a historical period of time, wherein the historical transaction data includes a plurality of merchant category codes (MCCs) associated with the plurality of historical transactions, and wherein obtaining the historical transaction data includes generating a zero value for a percentage distribution of a transaction amount for each MCC for a historical sub-period of time that does not include a transaction of the plurality of historical transactions;

applying, with the at least one processor, a difference transform to the historical transaction data to generate transformed data in which trends and seasonality have been removed from the time series;

training, with the at least one processor, a machine learning model an isolation forest by applying a machine learning an isolation forest algorithm to the transformed data, wherein the machine learning model isolation forest generates an anomaly score associated with the merchant system by generating for each historical sub-period of time of a plurality of historical sub-periods of time, the anomaly score;

obtaining, with the at least one processor, previous transaction data associated with one or more previous transactions at the merchant system over a previous period of time after the historical period of time, wherein the previous transaction data includes one or more MCCs of the plurality of MCCs associated with the one or more previous transactions, wherein the historical transaction data includes a percentage distribution of a transaction amount for each MCC of the plurality of MCCs of a subset of transactions of the plurality of historical transactions for a plurality of historical sub-periods of time within the historical period of time, wherein a duration of a historical sub-period of time is a same duration as the previous period of time, and wherein the previous transaction data includes a percentage distribution of a transaction amount for each MCC of the one or more MCCs of the one or more transactions for the previous period of time;

processing, with the at least one processor, using the isolation forest, the previous transaction data to generate the anomaly score associated with the merchant system, wherein the isolation forest sub-samples and processes the previous transaction data in a tree structure based on random cuts in values of randomly selected features in the previous transaction data to generate a plurality of tree branches for the plurality of historical sub-periods of time in which deeper tree branches of the plurality of tree branches correspond to the anomaly score being less likely to be associated with an anomaly and shorter tree branches of the plurality of tree branches correspond to the anomaly score being more likely to be associated with an anomaly;

identifying, with the at least one processor, based on the anomaly score and at least one threshold anomaly score, a shift in transaction volume of the merchant system across MCCs for the previous period of time;

receiving, with the at least one processor, during processing of a current transaction at the merchant system in a transaction processing network, current transaction data associated with the current transaction, wherein the current transaction data includes an MCC of the plurality of MCCs associated with the current transaction;

determining, with the at least one processor, based on current transaction data and the anomaly score associated with the merchant system, a risk score associated with the current transaction;

comparing, with the at least one processor, the risk score to at least one threshold risk score; and in response to determining that the risk score satisfies the at least one threshold risk score, denying, with the at least one processor, authorization of the current transaction in the transaction processing network.

2. A system comprising:
at least one processor programmed and/or configured to:
obtain historical transaction data associated with a time series of a plurality of historical transactions at a merchant system over a historical period of time, wherein the historical transaction data includes a plurality of merchant category codes (MCCs) associated with the plurality of historical transactions, and wherein obtaining the historical transaction data includes generating a zero value for a percentage distribution of a transaction amount for each MCC for a historical sub-period of time that does not include a transaction of the plurality of historical transactions;

apply a difference transform to the historical transaction data to generate transformed data in which trends and seasonality have been removed from the time series;

train an isolation forest by applying an isolation forest algorithm to the transformed data, wherein the isolation forest generates an anomaly score associated with the merchant system by generating for each historical sub-period of time of a plurality of historical sub-periods of time, the anomaly score;

obtain previous transaction data associated with one or more previous transactions at the merchant system over a previous period of time after the historical period of time, wherein the previous transaction data includes one or more MCCs of the plurality of MCCs associated with the one or more previous transactions, wherein the historical transaction data includes a percentage distribution of a transaction amount for each MCC of the plurality of MCCs of a subset of transactions of the plurality of historical transactions for a plurality of historical sub-periods of time within the historical period of time, wherein a duration of a historical sub-period of time is a same duration as the previous period of time, and wherein the previous transaction data includes a percentage distribution of a transaction amount for each MCC of the one or more MCCs of the one or more transactions for the previous period of time;

process, using the isolation forest, the previous transaction data to generate the anomaly score associated with the merchant system, wherein the isolation forest sub-samples and processes the previous transaction data in a tree structure based on random cuts in values of randomly selected features in the previous transaction data to generate a plurality of tree branches for the plurality of historical sub-periods of time in which deeper tree branches of the plurality of tree branches correspond to the anomaly score being less likely to be associated with an anomaly and shorter tree branches of the plurality of tree branches correspond to the anomaly score being more likely to be associated with an anomaly;

identify, based on the anomaly score and at least one threshold anomaly score, a shift in transaction volume of the merchant system across MCCs for the previous period of time;

receive, with the at least one processor, during processing of a current transaction at the merchant system in a transaction processing network, current transaction data associated with the current transaction, wherein the current transaction data includes an MCC of the plurality of MCCs associated with the current transaction;

determine, with the at least one processor, based on current transaction data and the anomaly score associated with the merchant system, a risk score associated with the current transaction;

compare, with the at least one processor, the risk score to at least one threshold risk score; and in response to determining that the risk score satisfies the at least one threshold risk score, deny, with the at least one processor, authorization of the current transaction in the transaction processing network.

3. A computer program product comprising at least one non-transitory computer-readable medium including program instructions that, when executed by at least one processor, cause the at least one processor to:

obtain historical transaction data associated with a time series of a plurality of historical transactions at a merchant system over a historical period of time, wherein the historical transaction data includes a plurality of merchant category codes (MCCs) associated with the plurality of historical transactions, and wherein obtaining the historical transaction data includes generating a zero value for a percentage distribution of a transaction amount for each MCC for a historical sub-period of time that does not include a transaction of the plurality of historical transactions;

apply a difference transform to the historical transaction data to generate transformed data in which trends and seasonality have been removed from the time series;

train an isolation forest by applying an isolation forest algorithm to the transformed data, wherein the isolation forest generates an anomaly score associated with the system by generating for each historical sub-period of time of a plurality of historical sub-periods of time, the anomaly score;

obtain previous transaction data associated with one or more previous transactions at the merchant system over a previous period of time after the historical period of time, wherein the previous transaction data includes one or more MCCs of the plurality of MCCs associated with the one or more previous transactions, wherein the historical transaction data includes a percentage distribution of a transaction amount for each MCC of the plurality of MCCs of a subset of transactions of the plurality of historical transactions for a plurality of historical sub-periods of time within the historical period of time, wherein a duration of a historical sub-period of time is a same duration as the previous period of time, and wherein the previous transaction data includes a percentage distribution of a transaction amount for each MCC of the one or more MCCs of the one or more transactions for the previous period of time;

process, using the isolation forest, the previous transaction data to generate the anomaly score associated with the merchant system, wherein the isolation forest sub-samples and processes the previous transaction data in a tree structure based on random cuts in values of randomly selected features in the previous transaction data to generate a plurality of tree branches for the plurality of historical sub-periods of time in which deeper tree branches of the plurality of tree branches correspond to the anomaly score being less likely to be associated with an anomaly and shorter tree branches of the plurality of tree branches correspond to the anomaly score being more likely to be associated with an anomaly;

identify, based on the anomaly score and at least one threshold anomaly score, a shift in transaction volume of the merchant system across MCCs for the previous period of time;

receive, with the at least one processor, during processing of a current transaction at the merchant system in a transaction processing network, current transaction data associated with the current transaction, wherein the current transaction data includes an MCC of the plurality of MCCs associated with the current transaction;

determine, with the at least one processor, based on current transaction data and the anomaly score associated with the merchant system, a risk score associated with the current transaction;

compare, with the at least one processor, the risk score to at least one threshold risk score; and in response to determining that the risk score satisfies the at least one threshold risk score, deny, with the at least one processor, authorization of the current transaction in the transaction processing network.

\* \* \* \* \*